M. MATHIESEN.
SPRING WHEEL.
APPLICATION FILED SEPT. 29, 1913.
1,087,963.
Patented Feb. 24, 1914.
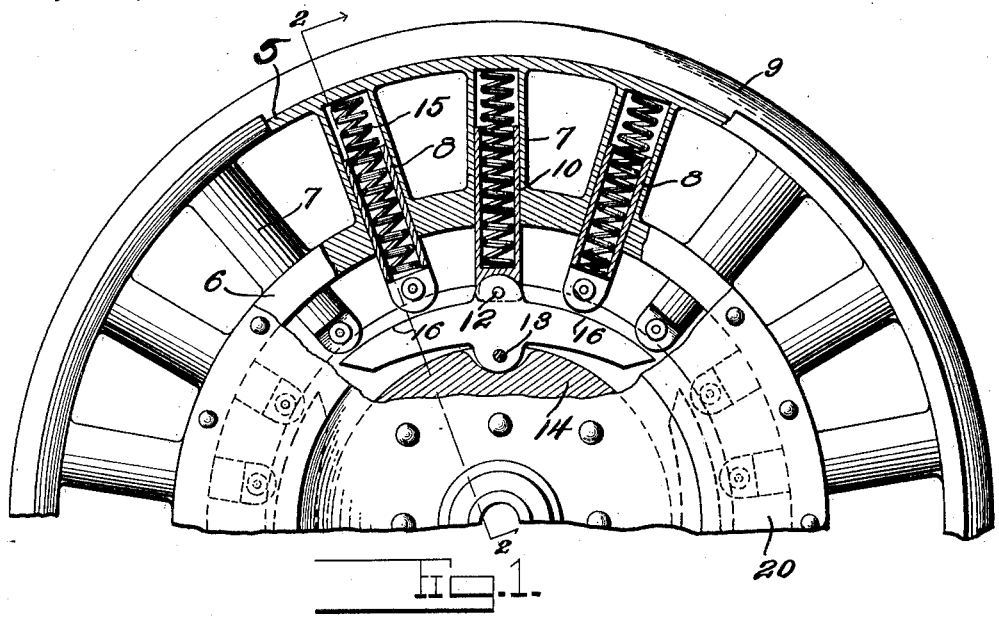
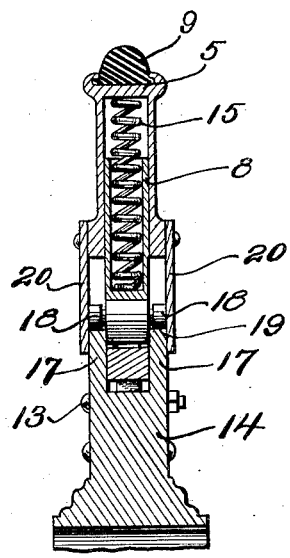
Inventor
Marius Mathiesen

UNITED STATES PATENT OFFICE.

MARIUS MATHIESEN, OF SAN ANTONIO, TEXAS, ASSIGNOR TO MATHIESEN SPRING CUSHION WHEEL COMPANY, A CORPORATION OF MAINE.

SPRING-WHEEL.

1,087,963.  Specification of Letters Patent.  Patented Feb. 24, 1914.

Application filed September 29, 1913. Serial No. 792,467.

*To all whom it may concern:*

Be it known that I, MARIUS MATHIESEN, citizen of the United States, residing at San Antonio, in the county of Bexar and State of Texas, have invented certain new and useful Improvements in Spring-Wheels, of which the following is a specification.

This invention relates to resilient vehicle wheels and has for its object, the provision of an improved device of this character constructed in such manner as to effectually resist both the vertical and lateral stresses to which the wheel is subjected when in use.

Further objects and advantages of the invention will be set forth in the detailed description which now follows:

In the accompanying drawing, Figure 1 is a view partly in side elevation and partly in section, of a portion of a vehicle wheel constructed in accordance with the invention, and Fig. 2 is a transverse sectional view therethrough.

Like numerals designate corresponding parts in both of the figures of the drawing.

By referring to the drawing, it will be seen that the wheel comprises an outer annular rim 5 and an inner annular ring 6 spaced from each other and held in rigid relation by tubular sleeves 7, said sleeves forming housings in which hollow plungers 8 and 10 slide. The rim 5 carries a tire, preferably of solid rubber, indicated at 9. Certain of the tubular sleeves 7 house plungers 10, the lower portions of which are pivoted at 11 to rockers 12, the opposite sides of said rockers being pivoted at 13 to a central hub member 14. All of the plungers 8 and 10 receive springs 15 which bear between rim 5 and the lower ends of the plungers 8 are rounded to receive the thrust of the convex faces 16 of rocker 12 and the lower ends of these plungers enter and bear between outstanding flanges 17 of the hub member 14. Rollers 18 carried by the lower portions of the plungers travel upon the trackways 19 formed by the peripheral faces of said flanges, the entry of the lower ends of said plungers between the side flanges 17 effectually resisting the lateral thrust given to the hub member 14 when the wheel tends to skid in turning corners.

When a wheel of this nature is used as a driving wheel, it is apparent that there is a tendency for the hub portion 14 to rotate with relation to the outer portion of the wheel. This movement is in addition to the vertical movement of the hub portion with relation to the outer portion and such tendency to rotate causes a rocking of the rocker, which movement of the rocker is resisted when its concave portions 16 contact with the lower ends of the plungers 8.

To prevent the entry of dust, dirt and mud to the space occupied by the rockers, plates 20 may be employed, said plates being carried by the outer portion of the wheel and having slidable movement over the face of the hub member.

From the foregoing description, it will be seen that simple and efficient means are herein provided for accomplishing the objects of the invention, but while the elements shown and described are well adapted to serve the purposes for which they are intended, it is to be understood that the invention is not limited to the precise construction set forth, but includes within its purview such changes as may be made within the scope of the appended claims.

Having described my invention, what I claim is:

1. In a resilient vehicle wheel, the combination with an outer annular portion, of a hub portion, a plurality of spring actuated plungers radially movable in said outer portion toward said hub portion, rocker arms disposed between said hub portion and said outer portion, said rocker arms having concave faces disposed toward said outer portion, said rocker arms being pivoted at one side at their central portions to said hub portion and pivoted at their opposite side to some of said plungers, the other of said plungers lying in the line of travel of said rocker arms and having convex heads adapted to be engaged by the convex faces of said rocker arms, said hub portion being provided with a pair of spaced, circumferential flanges between which the inner ends of said last named plungers enter, said plungers carrying rollers which travel upon the peripheral faces of said flanges.

2. In a resilient vehicle wheel, the combination with an outer annular portion, of a hub portion, a plurality of spring actuated plungers radially movable in said outer portion toward said hub portion, rocker arms disposed between said hub portion and said outer portion and pivoted at one side at their central portions to said hub portion and pivoted at their opposite side to some of said plungers, the other of said plungers lying in the line of travel of said rocker arms and adapted to be engaged thereby, said hub portion being provided with outstanding flanges between which the inner ends of said last named plungers travel, said plungers carrying rollers which travel upon the peripheral faces of said flanges.

In testimony whereof I affix my signature in the presence of two witnesses.

MARIUS MATHIESEN.

Witnesses:
C. W. BUHLER,
J. M. HAMILTON.

Copies of this patent may be obtained for five cents each, by addressing the "Commissioner of Patents, Washington, D. C."